(12) United States Patent
Chao et al.

(10) Patent No.: US 6,204,955 B1
(45) Date of Patent: Mar. 20, 2001

(54) APPARATUS FOR DYNAMIC CONTROL OF LIGHT DIRECTION IN A BROAD FIELD OF VIEW

(75) Inventors: Yong-Sheng Chao; Ying Zhao, both of Storrs, CT (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 0 days.

(21) Appl. No.: 09/503,828

(22) Filed: Feb. 15, 2000

Related U.S. Application Data

(63) Continuation-in-part of application No. 09/350,388, filed on Jul. 9, 1999, now abandoned.

(51) Int. Cl.[7] .............................. G02B 26/00; G02B 1/33; G02B 27/10
(52) U.S. Cl. .......................... 359/298; 359/305; 359/627
(58) Field of Search .............................. 359/15, 298, 618, 359/627, 629, 641, 323, 319, 305, 312, 32, 33

(56) References Cited

U.S. PATENT DOCUMENTS

| | | | |
|---|---|---|---|
| 3,624,817 | * 11/1971 | Lee | 359/303 |
| 4,836,629 | 6/1989 | Huignard et al. | 359/15 |
| 5,034,627 | * 7/1991 | Ayral et al. | 359/305 |
| 5,282,073 | * 1/1994 | Defour et al. | 359/159 |
| 5,526,168 | 6/1996 | Parl | 359/226 |
| 5,920,662 | 7/1999 | Hinkov | 385/14 |
| 6,115,168 | * 9/2000 | Zhao et al. | 359/247 |

* cited by examiner

*Primary Examiner*—Georgia Epps
*Assistant Examiner*—Saeed Seyrafi
(74) *Attorney, Agent, or Firm*—Morse, Altman & Martin

(57) ABSTRACT

An apparatus for extending the light deflection angle, so a light beam can be dynamically controlled within ±90°, pitch and yaw. The device comprises an initial dynamic beam deflector and a compound light beam direction mapper. The beam direction mapper includes a beam size reducer, a beam transmission adapter, and a projector. An initial light beam from a light source is deflected a small amount by the initial dynamic beam deflector. The initially deflected light beam is focused by the beam size reducer to a light energy spot on the beam transmission adapter, which transfers the light spot to the projector. The projector emits an output light beam at the far field of its output space with an output deflection angle larger than the initial deflection angle. All components are based on classical geometry optics and the energy of the output light beam is within an order of magnitude of that of the input light beam.

5 Claims, 5 Drawing Sheets

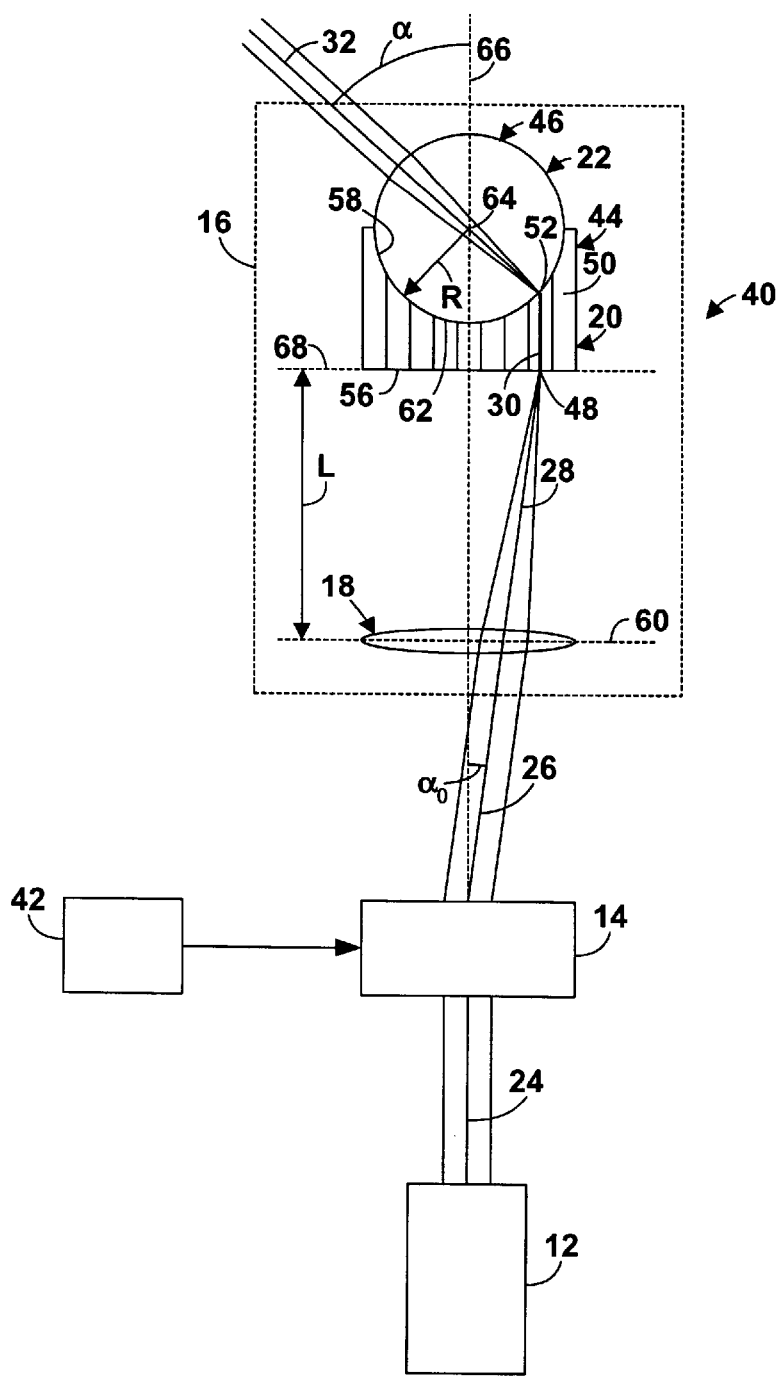
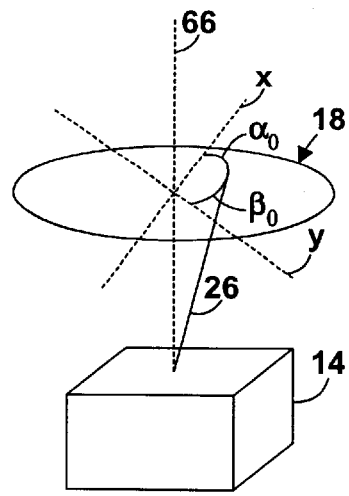
FIG. 3
FIG. 4

APPARATUS FOR DYNAMIC CONTROL OF LIGHT DIRECTION IN A BROAD FIELD OF VIEW

RELATED APPLICATIONS

The present application is a continuation-in-part application of application Ser. No. 09/350,388, dated Jul. 9, 1999 for APPARATUS FOR DYNAMIC CONTROL OF LIGHT DIRECTION IN A BROAD FIELD OF VIEW in the names of Yong-Sheng Chao and Ying Zhao now abandoned.

BACKGROUND OF THE INVENTION

1. Field of the Invention

This invention relates generally to light direction control, and more particularly, to techniques for the dynamic control of light propagation direction.

2. The Prior Art

The dynamic control of light propagation direction is a fundamental technique in optics. Direct applications include laser radar systems, laser projection displays, target-tracking systems, land survey systems, entertainment, laser printers, laser machining, metrology, laser scanning, and optical communications.

Currently, there are four significant light deflection methods: electromechanical, acousto-optic, electro-optic, and electrically-controlled light grating methods. Of these four methods, electromechanical methods are used most frequently in commercial application products. Electromechanical methods use a rotating mirror or rotating prism as a mechanical device for changing light direction. These devices have a number of limitations due to the intrinsic nature of mechanical movement on a macroscopic scale. For example, they are relatively slow. Generally, it takes milliseconds for changing the light beam from one direction to another direction. Also, such systems are susceptible to interference from mechanical vibration.

The other three types of methods contain no mechanical moving parts at the macroscopic scale. However, the maximum deflection angle range often constitutes an important limiting factor to their performance. For example, the maximum deflection angle that the fully electronic control methods of the prior art can provide is generally less than ±3°. The small deflection angle essentially excludes electronic control methods from nearly all important practical applications. Electromechanically-controlled rotating mirror devices can provide moderately larger deflection angle. The maximum deflection angle for two-dimensional electromechanically-controlled rotating mirrors is usually much less than ±30°, limited by the geometry of mechanical parts. And, in many important light scanning applications, such as laser radar systems, a much larger scanning angle range is often required. Thus, even the maximum deflection angle range of the electromechanical systems is still insufficient.

In the prior art, U.S. Pat. No. 4,836,629, issued to Huignard, discloses a holographic multiplexer system for changing light beam direction in a broad field of view. The key component is a holographic multiplexer, the operation of which is based on the wave nature of light. Specifically, in the Huignard system, a light beam is split into multiple beams with different directions of propagation through the interference of coherent electromagnetic waves. Huignard then uses a shutter to select which of the light beams to output from the system. One shortcoming of the Huignard system is that the energy of the output light is only a small percentage of the input light energy. For example, if the holographic multiplex outputs a matrix of $N \times N = N^2$ beams, each beam will have a maximum energy level of only $1/N^2$, and since $N^2$ is typically in the hundreds or thousands, the output energy is very small indeed when compared to the input energy.

It must be noted that the holographic hardware and process are often too complicated for practical applications. For example, Huignard's system uses an additional laser system, a two-dimensional phase modulator, and additional nonlinear optical material for pumping external laser energy back into the output light beam in order to compensate for the light energy lost in the holographic multiplexing process. Quantitatively, the additional laser must have a power output many times higher than that of the incident laser source in order to compensate for losses in the pumping system. Additionally, for the multiplexer to work, a rather delicate 2D detector system must be used to first record a hologram and then use a rather complex process to reconstruct the original wave front for providing multiple split beams. This all makes the Huignard system too complex and delicate for many practical applications.

In terms of classical geometry optics, the standard method for increasing an initially-deflected light beam deflection angle a small amount (typically ±5°) uses a light beam expander. As shown in FIG. 2, the beam expander is a lens system having two positive lenses sharing a common focal plane 112. The focal length $f_1$ of one lens 102 is much larger than the focal length $f_2$ of the second lens 104. When a well-collimated light beam travels from the second lens 104 to the first lens 102, as at 106, the beam size is increased by a factor of $f_1/f_2$. When a beam expander is used in the reverse direction, that is, from the first lens 102 to the second lens 104, as at 108, the beam size is reduced and the deflection angle of the input beam relative to the optical axis 110 is enlarged by a factor of $f_1/f_2$. When $f_1/f_2$ is large, however, the most important limiting condition is the maximum deflection angle of the output light beam. The output light beam always goes from the output surface 114 of the small lens 104 to the optical axis 110, and crosses the optical axis 110 at a distance δ from the small lens 104. The ratio of r/δ, where r is the radius of the small lens 104, directly determines the maximum deflection angle.

A telescope eyepiece has an even more specifically defined purpose. Because the user looks directly into the system with the eye, the light beam output is designed to be about 5 to 10 mm away from the surface of the small lens, and the light beam is about 2 mm in width to match the pupil size of a human's eye.

It can be seen, therefore, that the beam expander or a standard telescope eyepiece is a device that largely provides an output light beam in the near field. The maximum deflection angle range is very limited because the output light beam always goes towards the optical axis and the value of δ cannot be very small. Also, the light beam distortion and degradation is large, because the output light beam comes from the edge of the lens. When a compound lens system is used, these lens system are designed to function at the near field of the lens system, not the far field. After the light beam passes through the optical axis and into the far field, the beam degradation often becomes unacceptable.

SUMMARY OF THE INVENTION

An object of the present invention is to provide an apparatus for the control of the direction of a light beam.

Another object is to provide an apparatus for the control of the direction of a light beam over a wide range of angles.

The present invention provides an apparatus for extending the light deflection angle, so a light beam can be dynamically controlled to move to any direction in space within a large range of angles, typically ranging from ±90° in both pitch and yaw. The apparatus of the present invention can be applied to fully electronic control systems, free of mechanical moving parts. Because of this, the limitation of the electronic methods for light direction no longer apply, making available completely electronic control of a light beam in a broad angle range, free of any moving parts, for a broad spectrum of applications. Also, the apparatus of the present invention can be applied to systems containing rotating mirror or other moving parts as well.

The present invention uses simple classical geometry optics components to provide a system with dynamic control of light beam direction within a large angle range. All the geometry optics components are passive components without the need of pumping additional light energy into the system. The output light beam energy is typically within an order of magnitude of the incident light beam energy. The system structure is simple, and the system cost is significantly less than that of a holographic system.

The present invention is a light direction control device adapted for dynamically controlling the direction of an initial light beam emitted from a light source. The device comprises, in physical order, an initial dynamic beam deflector and a light beam direction mapper. The initial dynamic beam deflector receives the initial light beam and emitting the initial light beam as an initially deflected light beam at an initial deflection angle $\theta_0$. The light beam direction mapper is based on geometry optics and has an output space with a far field. The light beam direction mapper receives the initially deflected light beam at an input surface and transmits an output light beam to the far field, the output light beam having an output deflection angle $\theta$ larger than the initial deflection angle. The light beam direction mapper includes a beam size reducer, a beam transmission adapter, and a projector. The beam size reducer receives the initially deflected light beam and provides a focused light beam to a light energy spot on the beam transmission adapter. The beam transmission adapter receives the light energy spot and propagates the light energy spot to an emitting surface. The projector receives the propagated light energy spot and emits the output light beam such that a central ray of the output light beam does not cross the optical axis of the device.

The light source emits a light that is compatible with the initial dynamic beam deflector. The initial dynamic beam deflector can be any currently available device for providing a controllable small angle deflection, such as electromechanically-controlled deflectors, acousto-optic deflectors, electro-optic deflectors, and electronically-controlled grating devices, and may either a one-dimensional or two-dimensional deflector.

In the first embodiment, the beam transmission adapter is a fiber optic plate and the projector is a specialty sphere lens. The beam size reducer reduces the initially deflected beam to essentially a light energy spot that is approximately the size of the diameter of a single fiber in the fiber optic plate. The light energy spot propagates only within a single fiber or adjacent sets of fibers to an emitting surface. The propagated light energy spot meets a focal point on the hemispherical focal surface of the specialty sphere lens. The specialty sphere lens emits the light energy spot as a well-collimated beam pointing to infinity with a direction along the straight line connecting the focal point and the center point of the specialty sphere lens. Since there is a one-to-one correspondence between the direction of the outgoing light beam and the position of the light energy spot on the three-dimensional focal surface of the specialty sphere lens, there is a one-to-one correspondence between the direction of the outgoing light beam and the direction of the initially deflected light beam.

The second embodiment uses a positive lens for the transmission adapter and a reversed geometry optics camera imaging lens system as the projector. In conventional imaging lens system, the light beam propagates from the far field of the input space and is focused on the focal plane. In the present invention, the light propagation is in the reverse direction, converting the input space to an output space.

The imaging lens system preferably has first and second subassemblies that function respectively as a positive lens assembly and a negative lens assembly. The first subassembly guides the light beam across the optical axis, and the second subassembly provides a boost for the beam deflection. The final deflection angle of the output light beam at the far field can be as large as ±90°.

Lens aberrations have a much smaller effect on a narrow beam than on a broad beam, and the incident light beam is always narrow because the beam reducer focal length is much larger than the distance from the first subassembly focal plane to the surface of the first subassembly. In addition, the aberrations of positive and negative lens assembly can be designed to significantly offset each other.

The third embodiment replaces the specialty sphere lens of the first embodiment with a conventional lens assembly. Although the third embodiment does not provide the same large angle deflection, it is easier to fabricate.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 3 is a schematic diagram of the first embodiment of the present invention;

FIG. 4 is a perspective view of a portion of the embodiment of FIG. 1 showing deflections in two dimensions;

DETAILED DESCRIPTION

Figure 1:
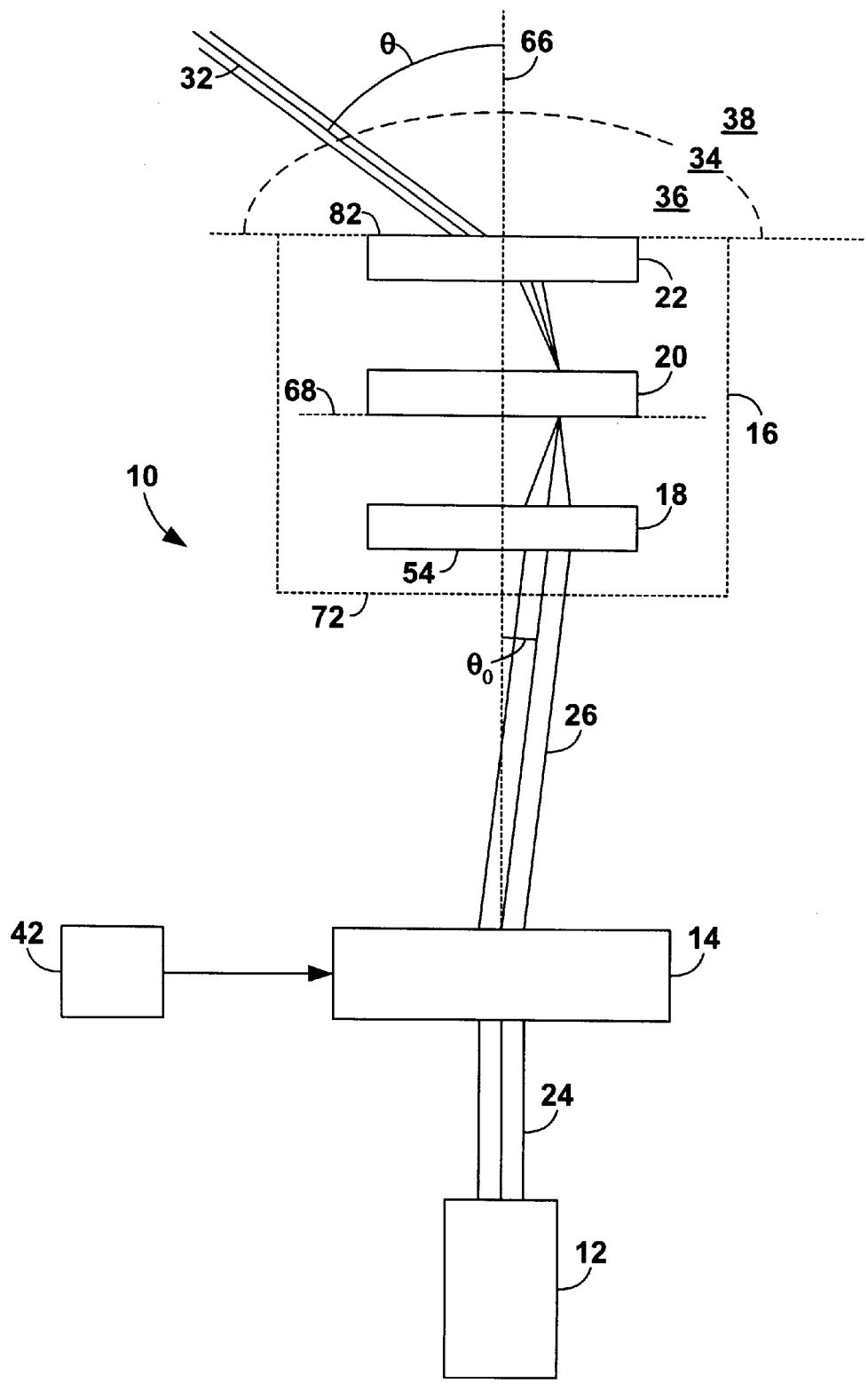
FIG. 1 is a schematic diagram of a general embodiment of the present invention.

The basic light beam direction control system 10 of the present invention, a block version of which is shown in FIG. 1, comprises an initial dynamic beam deflector 14 and a compound light beam direction mapper 16 based on classical geometry optics for providing an output light beam with an increased deflection angle. In the remainder of this specification, the compound light beam direction mapper 16 based on classical geometry optics is denoted simply as the "beam direction mapper."

The present invention 10 is intended for use with a light source 12 that comprises a light emitting device, such as a laser or lamp as a light source, and a conventional optical system to appropriately modify the light emitting device output to meet the specific requirements of the initial dynamic beam deflector 14 for optimal performance, as discussed below. The techniques used in the light source 12 are standard and well-established.

The light beam 24 from the laser source 12 passes through the initial dynamic beam deflector 14, undergoing an initial deflection $\theta_0$, as measured between the light beam direction and the optical axis 66 of the system. The initial dynamic beam deflector 14 is controlled by an external device 42. The initial deflection angle $\theta_0$ can range, for example, from ±0.001° to ±45°, depending upon the type of initial beam deflector used. The initially deflected beam 26 then passes through the beam direction mapper 16, which increases the initial small deflection $\theta_0$ to an output deflection $\theta$. In some embodiments, the output deflection angle $\theta$ can be as large as nearly ±90°.

The initial dynamic beam deflector 14 can be any currently available device for providing a small angle deflection, and the type of initial dynamic beam deflector 14 determines the required parameters of the initial light beam 24. As indicated above, there are currently four types of dynamic light beam deflectors: electromechanically-controlled deflectors, acousto-optic deflectors, electro-optic deflectors, and electronically-controlled grating devices. The initial dynamic beam deflector 14 can be either a one-dimensional or two-dimensional deflector.

An electromechanically-controlled deflector uses a rotating mirror or prism. It requires that the size of the initial beam be small enough to be compatible with the size of the mirror. It also requires that the initial beam have a well-defined direction, preferably collimated. The light wavelength can be any that is within the optical wavelength range of the mirror or prism. Electromechanically-controlled rotating mirrors and prisms can provide a moderately large angular coverage. For example, a typical two-dimensional galvano-scanner has a maximum excursion of ±30°. The main issue with electromechanical deflectors is their speed of operation.

An acousto-optic deflector comprises a transparent deflector medium, an ultrasonic wave transducer, and a radio frequency (RF) signal source to control the ultrasonic wave. In the deflection medium, an intense acoustic wave creates a density pattern similar to a moving grating. After a laser beam, the preferred light source, passes through the density grating, the deflection angle due to diffraction is sin $\alpha_0 = \alpha_0 = \lambda/(2\Lambda)$, where $\lambda$ is the wavelength of the light and $\Lambda$ is the wavelength of the sonic wave. Because the wavelength of the sonic wave is always much larger than that of the light wave, the deflection angle is always rather small. In an acousto-optic device, by tuning the RF signal frequency, the sonic wavelength $\Lambda$ is changed, and the laser beam can be deflected to different directions. Because there are no moving parts, the response is fast, usually on the order of 10 microseconds.

Acousto-optic deflectors require a monochromatic and well-collimated initial light beam. So the only practical light source is a laser. The wavelength can range from ultraviolet (UV) to infrared (IR). Beam size also affects the performance parameters, such as angular resolution and response time. Beam size of an acousto-optic deflector can vary, for example, from 1 mm×1 mm to 10 cm×10 cm. In many cases, the light beam directly emitted from a laser source has a beam size narrower than that required by the acousto-optical deflector. In those cases, a standard lens system is often used for appropriately enlarging the beam size. The maximum deflection angle of an acousto-optic deflector is usually less than ±2°.

In the electro-optic deflector, the index of refraction of the light transmission medium is affected by a high intensity electric field. When the light beam propagates from one medium to another, the direction of the light beam is deflected from one direction to another with the change of the electric field intensity. The response time of electro-optic deflectors can be in the nanosecond range. However, because the electro-optic coefficient is low, the deflection angle is small even for the electric field as high as between kilovolts to tens of kilovolts applied on a medium plate less than 1 mm thick. The feasible deflection angle of the electro-optic deflector is much less than ±2°. Unlike acousto-optic deflectors, electro-optic deflectors do not require that the light beam to be monochromatic. However, like the acousto-optic deflectors, the beam size affects the angular divergence of the output light beam. The larger the beam size, the less the output light beam divergence.

There are two types of electrically-controlled grating devices currently available: microelectromechanical (MEM) light grating valves (LGV) and liquid crystal gratings. The direction and intensity of the diffracted light beam can be controlled by electrical signals applied on the grating lines. The diffraction direction can only be changed in discrete steps. These devices require a monochromatic and well-collimated initial light beam. The maximum deflection angle is determined by the minimum line pitch that can be fabricated between grates. Currently, for example, the minimum line pitch d is about 5 $\mu$m. Thus, according to diffraction law, sin $\alpha = \lambda/d$, for $\lambda = 0.5$ $\mu$m, the maximum deflection angle would be about 5° in discrete steps.

The beam direction mapper 16 provides a fixed output mapping pattern of the initial deflection angle $\theta_0$, that is, the output deflection angle $\theta$ is a fixed function of the initial deflection angle $\theta_0$, or $\theta = M(\theta_0)$, where the function M is a fixed function for the specific beam direction mapper. The beam direction mapper 16 has a receiving surface 72 on one side and an output space 34 on the other side. An input light beam at one point on the input surface 72 propagates to the output surface 82 that emits an output light beam 32 in a far field 38 of the output space 34.

For a geometry optics lens system, the difference between the near field 36 and far field 38 is significant. A notable example is the well-known difference between microscopes and telescopes. A near field device is defined as one in which the performance of the device is better in the near field 36 than in the far field 38. A far field device performs better in the far field 38. For example, a great many telescope eyepieces provide a best performance at 5 to 10 mm distance from the output surface, making these near field devices. Such a device will not operate particularly well in the present invention.

The boundary between the near field 36 and far field 38 is based on the dimension of the beam direction mapper 16 itself. If the dimension of the beam direction mapper 16 is approximately q, defined as the average diameter of the lens assembly, then the near field 36 is defined as the region in the vicinity of the beam direction mapper 16 out to a distance of about 10 q. The far field 38 is the space outside of the near field 36.

The beam direction mapper 16 comprises three components: a beam size reducer 18, a beam transmission adapter 20, and a projector 22. The beam size reducer 18 is a conventional positive lens system that reduces the incident light beam essentially to a point without significantly affecting the deflection angle of the light beam. It reduces the size of the initially deflected light beam 26 to achieve an optimal direction resolution of the output light beam 32. The beam size reducer 18 has a receiving surface 54 at one side and a focal plane 68 at the other side. The single-direction incident light beam 26 is reduced to a single point 48 on the focal plane 68.

The beam transmission adapter 20 is a geometric optics device that receives a converging light beam at one side and emits a diverging light beam at the other side from essentially a single point. There are several types, described below with reference to the several embodiments.

The projector 22 provides the final output of the beam direction mapper. The projector 22 is a geometric optics lens assembly that has the following two unique features: (a) the central ray of the output light beam 32 does not cross the central optic axis 66, and (b) the output light beam 32 provides the best beam quality at the far field 38 of output space 34. When the output light beam 32 is a narrow beam, the meaning of the central ray is obvious. When the output light beam 32 has a finite width, the central ray can be defined as the gravity center line of the light beam. When a light beam propagates through air, there is generally no important difference between the gravity central line and the central ray calculated by using other averaging methods. Note that the projector 22 requires that only the central ray have no crossing point with the optical axis 66. When the light beam has a finite width, there may be side light rays, away from the central ray, that cross the optical axis 66. These side rays do not represent any characteristic feature of the system because the width of the light beam may vary. On the other hand, the central ray of the light beam represents the general path of the entire light beam.

Figure 2:
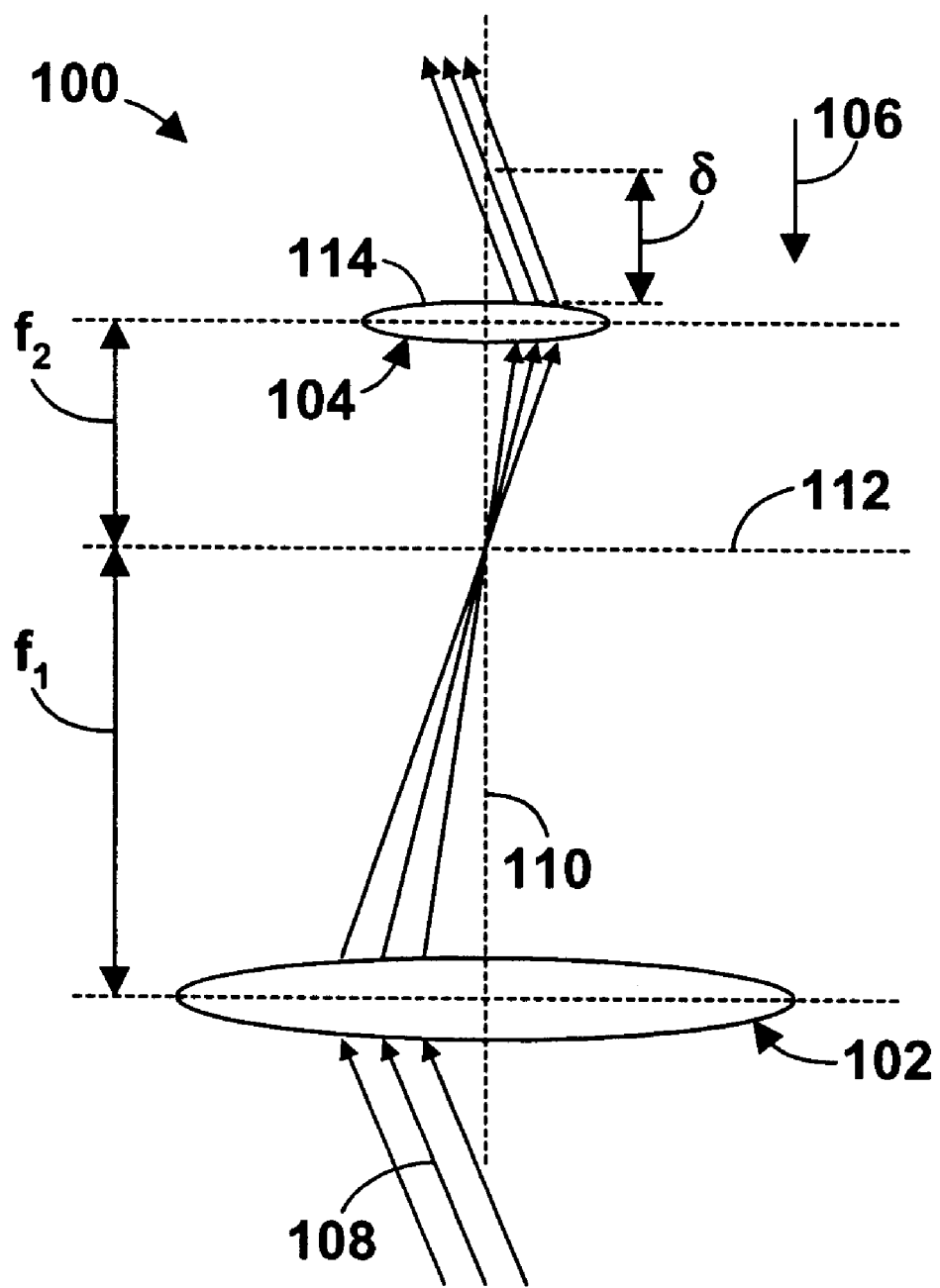
FIG. 2 is a schematic diagram of a prior art beam expanders.

These two characteristic features of the projector 22 represent a geometric lens system essentially different from the telescope systems of the prior art. As it is shown in FIG. 2, because telescopes are for interfacing to human eyes, there is always a crossing point for the central ray of the output light beam at a small distance δ from the output surface. On the other hand, for the beam direction mapper, no such crossing point exists. If the central ray of the light beam crosses the optical axis, it must do so within the projector 22. Note that the projector 22 defined in the present invention is not the same as a projection lens system used elsewhere.

The details of the beam transmission adapter 20 and the projector 22 differ according to the embodiments discussed below.

The First Embodiment

In the first embodiment 40 of the light beam direction control system of the present invention, shown in FIGS. 3 and 4, the beam transmission adapter 20 is a fiber optic plate 44 and the projector 22 is a specialty sphere lens 46. The initially deflected beam 26 passes through the beam size reducer 18 to reduce the beam to the light energy spot 48 on the receiving surface 56 of the fiber optic plate 44.

Because of the large difference between the size of the initially deflected beam 26 and the light energy spot 48, the beam size reducer 18 is essentially a focusing device. The focal plane 68 of the beam size reducer 18 should be on or close to the receiving surface 56 of the fiber optic plate 44. The smaller the light energy spot 48, the higher the angular resolution of the direction of the output beam 32. However, a light energy spot 48 that is too small may cause the energy density at the light energy spot 48 to be too large. By compromising on these requirements, the size of the light energy spot 48 and diameter of the optical fiber 50 are selected according to the specific application. Preferably, the size of the spot 48 is comparable in size to the diameter of a single fiber 50 in the fiber optic plate 44.

The fiber optic plate 44 is a fused optical fiber assemblage typically containing millions of optical fibers 50. Each optical fiber is governed by the rules of light refraction and reflection, that is, by geometry optics. When a converging light beam illuminates a fiber optic plate at approximately a point, the light energy enters a single optic fiber or a number of adjacent optical fibers and propagates strictly within these optical fibers without spreading. At the other side of the fiber optic plate the light energy is emitted in a form of a light cone. For each fiber optic plate, the angle of the cone is well defined and is independent of the incident light beam. The cone angle is determined by a quantity called Nominal Aperture (NA). NA is a parameter of the optical fiber material and is independent of the incident light beam.

$$NA = n_0 \times \sin U \tag{1}$$

where, $n_0=1.0$ if the light is emitted into air and U is the half of the cone angle. NA typically ranges from 0.2 to 1.0. For example, when NA=0.3, the output light beam is emitted within ±17.45° around the central axis of each single optic fiber transmitting the beam. NA is a parameter of all optical fiber devices. The present invention utilizes this feature as a light beam transmission adapter 20 for providing an optimized condition between the beam size reducer 18 and the projector 22. Because of this optimization, the system performance can be significantly enhanced.

For most conventional applications, the fiber optic plate is cut perpendicular to the axis of the optical fibers. However, it is not necessary that the emission surface be a planar surface. Note, also, that the receiving and emitting surface areas of the fiber optic plate may be of different sizes. When they are not of equal size, the fiber optic plate is sometimes called a fiber optic taper. The type and arrangement of the optical fibers will have an influence on the output deflection angle of the system.

Because of the large number of optical fibers fused together with virtually no separation, a fiber optic plate can transmit entire images from its input to its output. This differs substantially from a bundle of individual optical fibers, which typically have a sheath or other protective features that tend to widely separate the optical fibers.

The fiber optic plate 44 allows the light energy spot 48 to propagate only within a single fiber or adjacent set of fibers, so that after the light energy spot 48 propagates from the receiving surface 56 to the emitting surface 58 of the fiber optic plate 44, the spot size remains nearly the same.

The distance between the plane 60 of the beam size reducer 42 and the receiving surface 56 of the fiber optic plate 44 is designated L. The distance L is selected such that the distance of the maximum desirable initially-deflected light beam 26 from the central axis 66 at the receiving surface 56 of the fiber optic plate 44 is slightly smaller the radius of the specialty sphere lens 46. As illustrated in FIGS. 3 and 4, if the system is for two-dimensional light beam deflection where the initial deflection angle from the x axis is $\alpha_0$, the initial deflection angle from the y axis is $\beta_0$, and the beam size reducer 42 is a thin lens with a focal length f equal to the distance L, then the deviation position along x and y directions can be written as $$x = L \times \tan \alpha_0 \tag{2a}$$

$$y = L \times \tan \beta_0 \quad (2b)$$

The specialty sphere lens 46 is designed to have a hemispherical focal surface 62 substantially coincident with the emitting surface 58 of the fiber optic plate 44. Consequently, the emitting surface 58 is fabricated with a hemispherical surface complementary to the focal surface 62 of the specialty sphere lens 46. This can be done by using standard glass-grinding techniques.

There are a number of ways for making a specialty sphere lens 46 with a hemispherical focal surface. The simplest method is to use a glass material with an index of refraction n equal to or close to 2.0. According to standard geometry optics, it can be proved mathematically that when a paraxial collimated light beam illuminates a sphere with a diameter much larger than the beam size and with an index of refraction equal to or close to 2.0, the light beam focuses to a point on the back surface of the sphere. Alternatively, using one sphere core and a number of concentric shell structures with different index of refraction can also provide such a specialty sphere lens. The radius of the specialty sphere lens 46 can be in a range of from 5 mm to 100 cm.

After propagating through the fiber optic plate 44, the light energy spot 48 meets the specialty sphere lens 46 at a focal point 52 on the focal surface 62, and further refraction through the specialty sphere lens 46 results in emitting a well-shaped light beam 32. For example, when the focal surface 62 of the specialty sphere lens 46 is coincident with the emitting surface 58, the output light beam 32 is a well-collimated beam pointing to infinity with a direction along the straight line connecting the focal point 52 and the center point 64 of the specialty sphere lens 46. Note that the crossing of the optical axis 66 occurs internal to the beam directions mapper 16. The reason that the output light beam is well-collimated is that the light energy is located on a focal point 52 of the specialty sphere lens 46. Since there is a one-to-one correspondence between the direction θ of the outgoing light beam 32 and the position of the light energy spot 48 on the three-dimensional focal surface 62 of the specialty sphere lens 46, there is a one-to-one correspondence between the direction θ of the outgoing light beam 32 and the direction of the initially deflected light beam 26.

If the deflection angle of the output light beam 32 from the x axis is α and the deflection angle from the y axis is β, then the relationship between (α,β) and the initial deflection angle ($\alpha_0, \beta_0$) can be calculated for this simplified case as $$\sin \alpha = x/R \quad (3a)$$

$$\sin \beta = y/R \quad (3b)$$

where R is the radius of the specialty sphere lens 46. From equations (2a),(2b) and (3a),(3b), the output deflection of the output light beam 32 is $$\sin \alpha = (L/R) \times \tan \alpha_0 \quad (4a)$$

$$\sin \beta = (L/R) \times \tan \beta_0 \quad (4b)$$

As long as the distance L is much larger than the radius R, the deflection angle α of the output light beam 32 will always be a large multiple of the initial deflection angle $\alpha_0$. The same is true for β and $\beta_0$.

When the initial deflection angle $\alpha_0=0$, $\beta_0=0$, the center of the light beam is located at a point x=0, y=0 at the center of the fiber optic plate receiving surface 56. As the initial deflection angle $\alpha_0$ increases toward its maximum, the coordinate x moves from x=0 to x=R and the output light beam direction changes from α=0 to α=+90°. If the maximum initial deflection angle $\alpha_{max}$ for the initial beam deflector 14 is known, the output deflection angle α can always be designed to be nearly ±90° by appropriately choosing the radius R of the specialty sphere lens 46 and the focal length L. The same is true for β. Note that, due to practical physical limitations of the specialty sphere lens 46, it is not possible to achieve a deflection angle of ±90°, but it can closely approach ±90°.

In a numerical example, if the initial deflection angle $\alpha_0=\pm2°$ and the focal length L=28.64 cm, then x=y=1 cm. Correspondingly, the beam size reducer 42 should have a focal length of approximately 28.64 cm so that the initially deflected beam 26 can be reduced to a point at the fiber optic plate receiving surface 56. If the radius R of the specialty sphere lens 46 is R=1 cm, the small initial deflection angle $\alpha_0=\pm2°$ can be multiplied to nearly α=±90°, almost covering an entire external half space (2π steradian angle).

In cases when the necessary distance L is too large to fit into the space available for the light beam direction control system of the present invention, standard optics techniques can be used to fit the distance L into the available space. Such methods include, for example, inserting a pair of parallel reflecting mirrors so that the light beam is reflected back and forth in the cavity enclosed by the mirrors. In this case, the total light path length L is maintained, but the linear distance between the lens and the fiber optic plate is substantially reduced. Another method uses a lens system instead of a single lens to achieve a larger deviation distance x, thereby reducing the necessary distance L. For example, the Bravais lens system is one such standard lens system.

The direction resolution of the output light beam 32 is affected by the spatial resolution of the either the specialty sphere lens 46 or the fiber optic plate 44, whichever is coarser. The resolution of the fiber optic plate 44 is dictated by the diameter of the optical fibers 50, which is usually in the range of 5 μm to more than 1000 μm. The resolution of the specialty sphere lens 46 is dictated by the size of its focal point 52, and is dependent on the design accuracy of the specialty sphere lens 46, ranging from approximately 5 μm to 1000 μm.

The Second Embodiment

Figure 5:
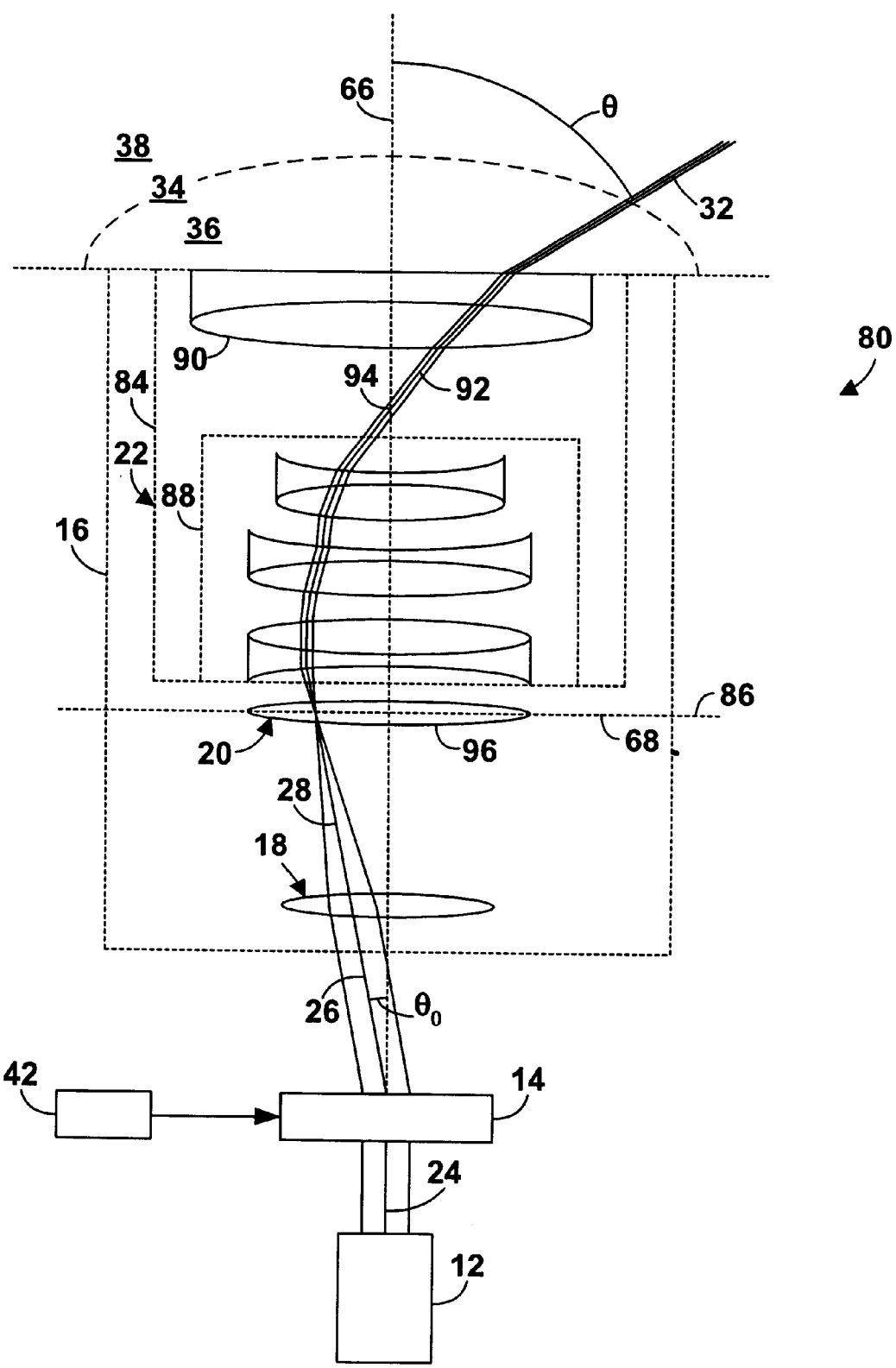
FIG. 5 is a schematic diagram of the second embodiment of the present invention.

The second embodiment 80, is shown in FIG. 5. The beam transmission adapter 20 is a positive lens assembly 96 and the projector 22 is a camera imaging lens system 84 used in the reverse direction. A camera imaging lens system is defined as a lens system that has a planar focal surface outside the lens system at one side in the vicinity of the lens system and an input space at the other side, so that a light beam from a point light source at a distance from the lens system in the far field of the input space focuses to a point on the focal plane.

The positive lens assembly 96 enhances of system performance. The positive lens assembly 96 has an equivalent focal length larger than zero. When a positive lens assembly has its central plane coincident with the focal plane 68 of the beam reducer 18, the direction of the light beam emitted from the focal plane 68 is changed. According to standard geometry optics formulas, the direction of the central ray of the emitted light beam is deflected by an angle V in relation to the central ray direction of the incident beam.

$$V = y/f \quad (5)$$

where f is the focal length of the positive lens 96 and y is the coordinate where the central ray crosses the central plane of the positive lens 96. That is, the lens rotates the central ray line of the incident light beam along the clockwise direction by an angle V. The farther away the central ray crosses the central plane of the positive lens 96, the larger the deflection angle. The above simple relationship holds true for a thin positive lens under paraxial approximation. For thick lenses or lens assemblies, and for higher order approximation results, more accurate calculations can be conducted, however, the basic features are the same. Similar techniques for using a positive lens or assembly to rotate the incident light beam can be found in standard geometric optics. Such lenses are called "field lens". Because of the rotation of the light beam, more light energy can be received by the next optical component, in this case, the camera imaging lens system 84. In geometric optics terms, the field aperture of the system is increased. Despite the similarity, the use of the positive lens 96 in the beam direction mapper 16 is essentially different than that in prior art.

Note that.the camera imaging lens system 84 must meet the two characteristic features of the projector 22, as described above. Almost all modern camera imaging lens systems do so. Some very primitive imaging lenses that may be used as camera lenses, for example, one hundred years ago, may not be able to meet the requirements of the projector. For example, a single positive lens or a simple doublet lens will not meet the requirements. Although these lenses have imaging capability, they have been essentially excluded from camera lenses.

According to modern camera convention, camera lenses can be divided into standard lenses, wide-angle lenses, and fish-eye lenses. A standard camera lens has a field of view at least ±20°, meaning that the most primitive imaging lenses, because of their limited field of view, are not included in camera imaging lenses according modern camera lens convention.

It is important to note that, although the camera imaging lens system used in the present invention has a grossly similar lens structure as the conventional camera imaging lens system in the prior art, the use of the camera imaging lens system in the present invention is in the reverse direction. Hence the operating principle is essentially different from that of the prior art. In the conventional imaging lens system where the input light beam is from the object at the far field of the input space of the lens system, the light beam propagation is from the far field to the lens system, where the light is focused on the focal plane as an image, and received by a photographic film, or a photodetector located on the focal plane. In the present invention, a camera imaging lens system with a similar lens structure is used. However, the light propagation is in the reverse direction, converting the input space to an output space.

As shown in FIG. 5, a well-collimated light beam 26 with an initial deflection angle $\theta_0$ is focused by the light beam reducer 18 to the focal plane 86 of the camera imaging lens system 84. The camera imaging lens system 84 outputs the light beam 32 to the far field 38 with a large deflection angle $\theta$ and with the desired beam performance parameters. In the near field 36, the quality of the beam 32 is of no concern.

The following is an explanation of the operation principle of the camera imaging lens system 84, and why using a conventional camera imaging lens system in the reverse direction can provide a large output deflection angle. The most important principle of the camera imaging lens system 84 is based on the well-known conjugate principle in classical geometry optics. According to the conjugate principle, a point on the focal plane and a point in the output space of an imaging lens system constitute a pair of conjugate points. Additionally, each point on the focal plane has a one-to-one correspondence with the output beam direction in the far field of the output space.

In the present invention, the focal plane surface 86 is the input surface and the far field 38 is the output space. When an imaging lens system is used in the reverse direction, light is emitted from a focal point, received by the imaging lens system, and transmitted in reverse direction to the light source point along the same path as that in an imaging process. When a wide-angle camera imaging lens system is used in the reverse direction as the imaging lens assembly 84, the output light beam 32 in the far field 38 will have a large output deflection angle $\theta$. The present invention contemplates several possible embodiments for the camera imaging lens system 84, including photographic imaging lens systems and digital imaging lens systems. The photographic imaging lens systems are analog imaging systems, designed for a photographic film at its focal plane. The digital imaging lens system is designed for a digital photodetector at its focal plane.

Note that in many cases, a special configuration of the camera imaging lens system 84 that simultaneously possesses the following two features can be especially useful in the present embodiment 80.

1. The camera imaging lens system 84 can be divided into two subassemblies. The first subassembly 88 functions as a positive lens assembly. A positive lens assembly has the ability to focus and a narrow light beam passing through a positive lens assembly is deflected towards the central optical axis. Thus, the first subassembly 88 guides the narrow light beam 92 towards and across the optical axis 66 of the system 80, as at 94. The first subassembly 88 provides a first stage of beam deflection. The second subassembly 90 acts as a negative lens and further provides a second stage of beam deflection. The second subassembly 90 is located an appropriate distance from the first subassembly 88. After the narrow light beam 92 leaves the first subassembly 88 and crosses the optical axis 66, the narrow light beam 92 enters the second subassembly 90, which directs the narrow light beam 92 at an increased angle from the optical axis 66. The second subassembly 90 provides a boost stage for the beam deflection. Because the output light beam 32 diverges farther from the optical axis 66 and the second subassembly 90 is larger than the first subassembly 88, the final deflection angle of the output light beam 32 at the far field 38 can be large, approaching ±90°.

2. Under the geometry conditions of the second embodiment 80, the beam 28 incident upon the first lens assembly 88 is always a narrow beam. This is because the focal length of the beam reducer 18 is generally much larger in comparison with the distance from the focal plane 86 to the surface of the first subassembly 88. When the incident beam 28 is narrow, it will remain within a narrow region throughout the entire path through the lens system 84. It is known that lens aberrations have a much smaller effect on a narrow beam than on a broad beam, providing a much higher output beam quality in the far field 38.

In addition, according to fundamental principles of geometry optics, the aberration of a positive lens assembly and the aberration of a negative lens assembly can be designed to significantly offset each other. This can be accomplished by choosing appropriate geometric and material parameters. The result is a beam direction mapper 16 that can simultaneously provide a high deflection angle with high beam quality.

One example of such a lens system is the camera lens assemblies with a retrofocus structure. According to standard definition, a retrofocus camera lens assembly has a negative lens subassembly followed by a positive lens subassembly, separated by a distance so that the back focal length of the lens assembly is longer than the effective focal length of the lens assembly. The retrofocus camera lens assembly is the basis for many wide-angle camera imaging lenses. As mentioned above, the use of the retrofocus camera lens assembly in the present invention is in the reverse direction, that is, the light beam first enter the positive lens subassembly.

Another example of such a system simultaneously meeting these conditions is a combination of an Erfle lens assembly as the first subassembly 88 and a negative lens assembly as the second subassembly 90 combined together to form a retrofocus lens system, as shown in FIG. 5. A retrofocus structure is comprised of a negative lens assembly and positive lens assembly. An Erfle lens assembly is composed of six positive and negative lens elements having an overall positive focusing capability. Erfle lens assembly has the ability to accept a narrow input beam and maintain it as a narrow beam along the entire light path. The Erfle lens assembly provides a relatively large first stage deflection A negative lens with a larger size as the second subassembly 90 will provide the deflected beam with a boost and provide a negative lens for offsetting the aberration of the Erfle lens assembly.

The Erfle lens assembly, as well as dozens of similar lens assemblies, have been used in classical telescope systems as an eyepiece. When used in reverse, the retrofocus structure is an important technique in the construction of wide angle camera lenses. However, no retrofocus structures combining a telescope eyepiece and a negative lens exists in the prior art to provide a two-stage deflection for the dynamic control of light beam deflection.

The Third Embodiment

Figure 6:
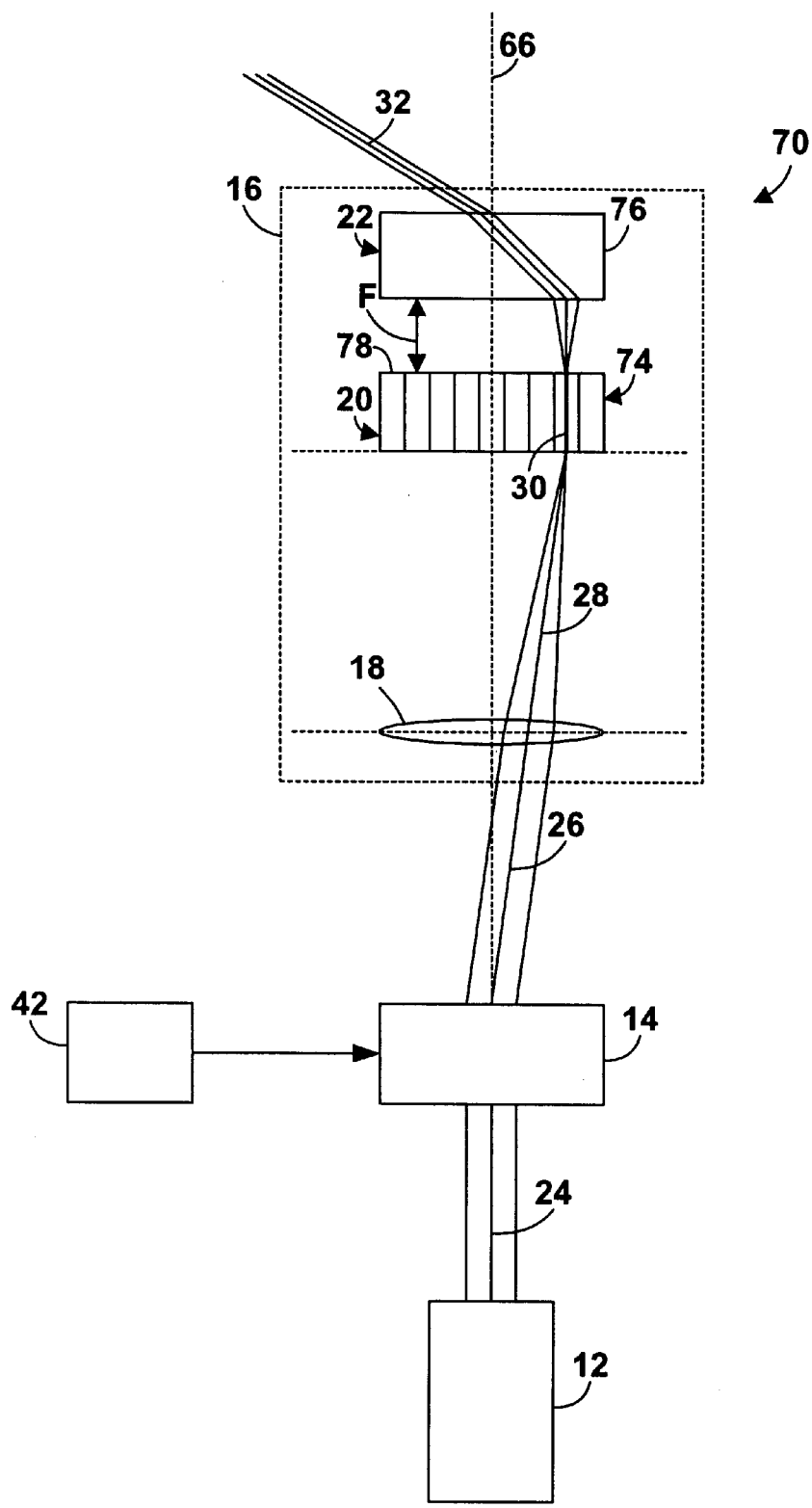
FIG. 6 is a schematic diagram of the third embodiment of the present invention.

The third embodiment 70, shown in FIG. 6, is the same as the first embodiment 10, with the exception that a modern camera imaging lens system 76 replaces the specialty sphere lens 46 of the first embodiment 10. Because the modern camera imaging lens systems 76 have planar focal surfaces, the fiber optic plate 74 must have a planar surface 78 for coupling to the conventional lens system 76. Thus, equations (2a) and (2b) become $$\tan \alpha = x/F \quad (6a)$$

$$\tan \beta = y/F \quad (6b)$$

where F is the focal length of the output lens system 76. The modern camera imaging lens system is the same as described in the second embodiment 80.

Note that generally in geometry optics lens systems there are a number optional devices. Appropriate use of any number of optional devices may enhance system performance without changing the essential operation principles of the system. Examples of such devices include planar mirrors for changing the direction of the optical axis of the system, diaphragms for controlling total energy flow and reducing background, relay lenses for extending the dimensions of the system, and field lenses functioning as the diaphragms.

Thus it has been shown and described an apparatus for the dynamic control of light direction in a broad field of view which satisfy the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A light direction control device adapted for dynamically controlling the direction of an initial light beam emitted from a light source, said device having an optical axis and comprising:

(a) in physical order, an initial dynamic beam deflector and a light beam direction mapper;

(b) said initial dynamic beam deflector receiving said initial light beam and emitting said initial light beam as an initially deflected light beam at an initial deflection angle; and (c) said light beam direction mapper being based on geometry optics and having an output space with a far field, said light beam direction mapper receiving said initially deflected light beam at an input surface and transmitting an output light beam to said far field, said output light beam having an output deflection angle larger than said initial deflection angle;

(d) said light beam direction mapper including a beam size reducer, a beam transmission adapter, and a projector;

(e) said beam size reducer receiving said initially deflected light beam and providing a focused light beam to a light energy spot on said beam transmission adapter;

(f) said beam transmission adapter receiving said light energy spot and propagating said light energy spot to an emitting surface;

(g) said projector receiving said propagated light energy spot and emitting said output light beam such that a central ray of said output light beam does not cross said optical axis.

2. The dynamic light direction control device of claim 1 wherein said beam transmission adapter is a fiber optic plate and said projector is a specialty sphere lens, said fiber optic plate propagating said light energy spot to a hemispherical emitting surface, said specialty sphere lens receiving said light energy spot at a hemispherical focal surface substantially coincident with said fiber optic plate hemispherical emitting surface, and emitting said light energy spot as said output light beam to said far field at said output deflection angle.

3. The dynamic light direction control device of claim 1 wherein said beam transmission adapter is a positive lens assembly and said projector is a geometry optics modern camera imaging lens system having a focal plane, said positive lens assembly being located substantially on said imaging lens system focal plane, said positive lens assembly receiving said light energy spot and propagating said light energy spot to said imaging lens system focal plane, said camera imaging lens system emitting said focused light beam as said output light beam to said far field at said output deflection angle.

4. The dynamic light direction control device of claim 3 wherein said imaging lens system comprises, in physical order, a compound positive lens assembly and a compound negative lens assembly separated by a distance, said compound positive lens assembly guiding said focused light beam within a narrow region and emitting said focused light beam as a narrow light beam that crosses said optical axis, said compound negative lens assembly receiving said narrow light beam, directing said narrow light beam farther from said optical axis, and emitting said narrow light beam as said output light beam to said far field at said output deflection angle.

5. The dynamic light direction control device of claim 1 wherein said beam transmission adapter is a fiber optic plate and said projector is a conventional output lens assembly, said fiber optic plate propagating said light energy spot to a planar emitting surface, said conventional output lens system receiving said light energy spot at a planar focal surface substantially coincident with said fiber optic plate emitting surface, and emitting said light energy spot as said output light beam to said far field at said output deflection angle.

* * * * *